Patented Apr. 19, 1927.

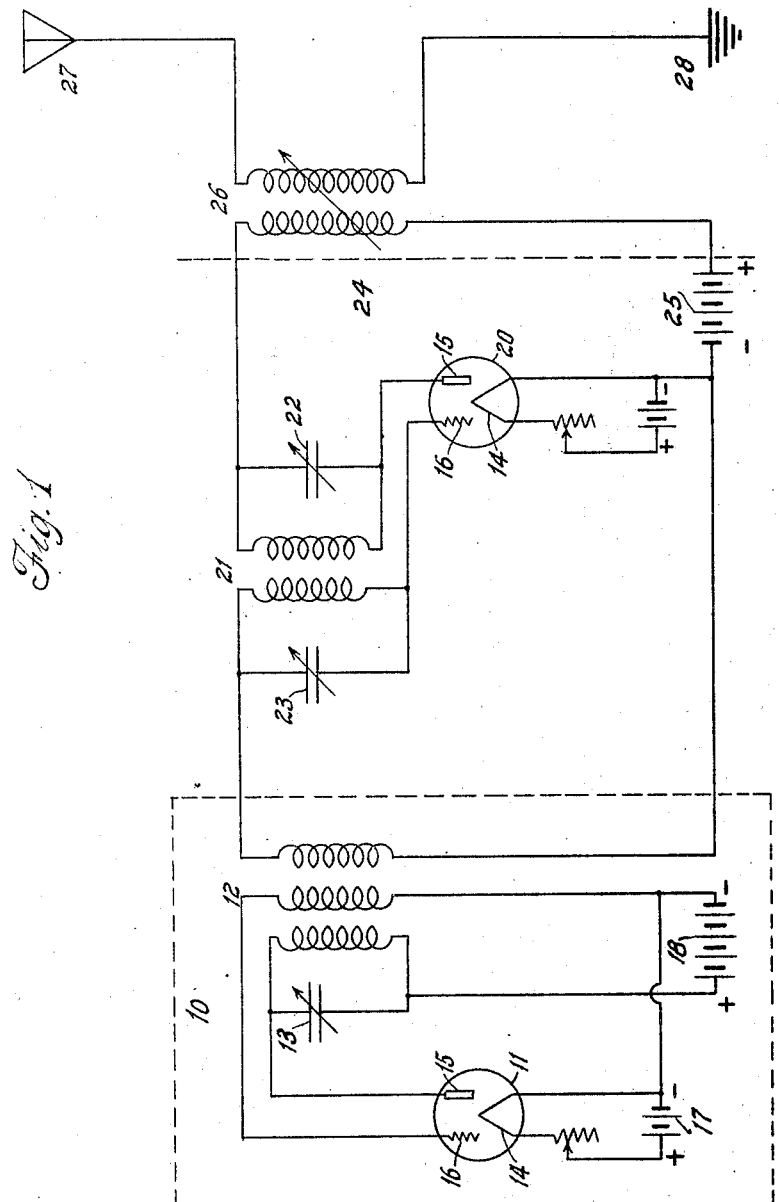

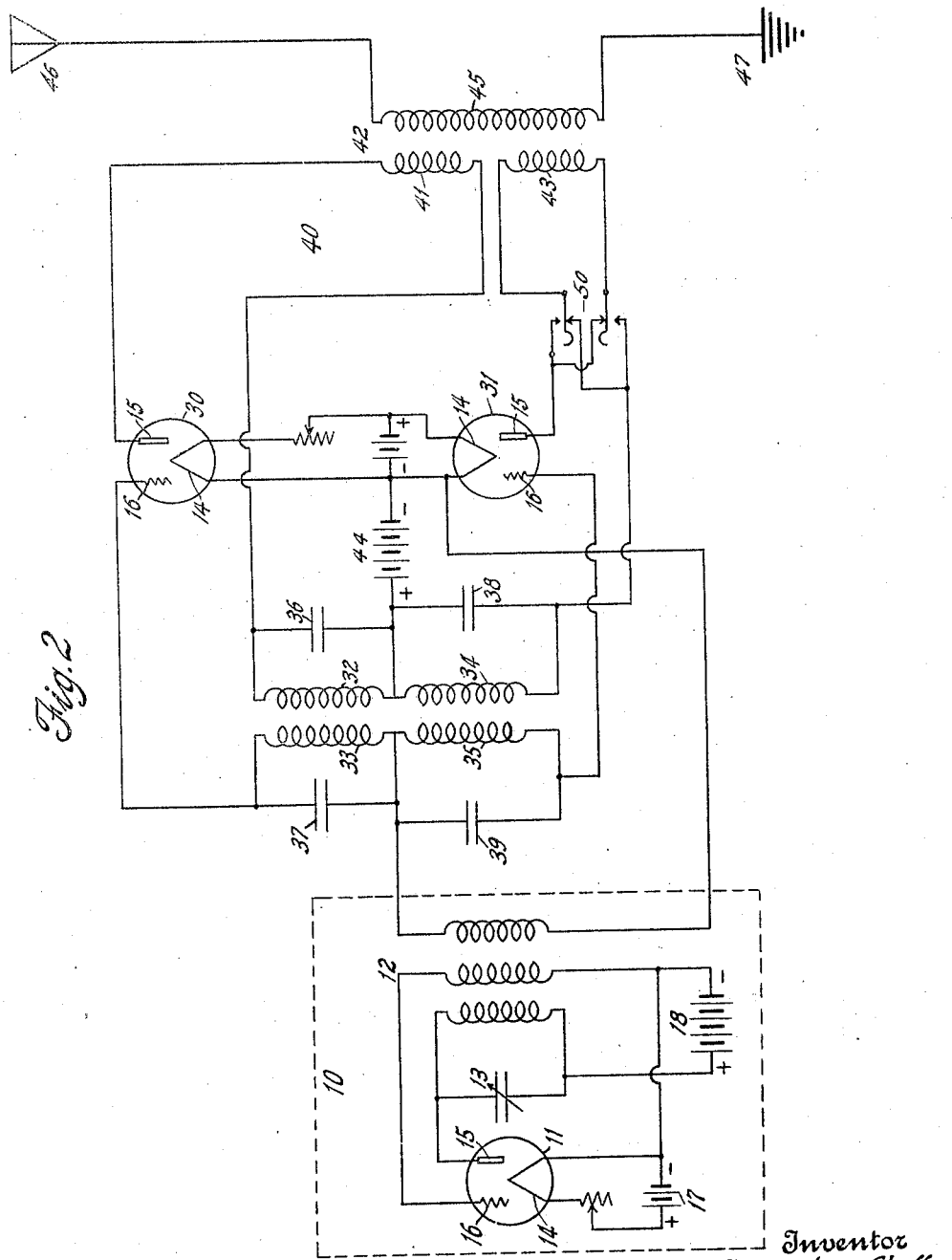

1,625,296

UNITED STATES PATENT OFFICE.

EMORY LEON CHAFFEE, OF BELMONT, MASSACHUSETTS.

METHOD OF AND MEANS FOR MODULATING SIGNALING CURRENTS.

Application filed August 2, 1922. Serial No. 579,288.

Some of the objects of the present invention are to provide an improved signaling system; to provide an improved method of producing modulated signaling currents for use in the transmission of intelligence; to provide means performing the double function of amplifying and modulating an oscillatory current; to provide a modulator for modulating a current of given frequency, the modulator itself being arranged to produce a second current of relatively different frequency; and to provide a method of and means for producing modulated high frequency power by amplifying an alternating current of the frequency to be modulated through an electron tube which is itself caused to oscillate at the desired frequency of modulation. Still other objects and features of the invention will appear hereinafter.

In the drawings, Fig. 1 shows a transmitting system embodying the features of my invention, and Fig. 2 shows a modified form of transmitting system.

Referring to Fig. 1, there is provided a source 10 of oscillatory current, the frequency of which is relatively high. It is understood that any appropriate source of oscillatory current capable of producing currents of high frequency may be employed, for example, an alternator or thermionic oscillator. That shown is of the thermionic oscillator type and includes a three-element thermionic device 11, a transformer 12 and a variable condenser 13 connected in a conventional manner for producing sustained oscillations. The device 11 is a so-called electron emitting thermionic device, or audion, comprising an evacuated or gas-filled bulb having a filament 14 forming a hot cathode for emitting electrons, a plate 15 forming an anode upon which the electrons impinge, and a grid 16 for controlling the passage of electrons. A battery 17 heats the filament 14, and a plate potential battery 18 renders the plate 15 positive with respect to the negative terminal of the filament. Included in the plate circuit is one winding of the transformer 12, and included in the grid circuit is a second winding thereof. The connections of these windings are such that a regenerative action is secured, the frequency of oscillation being determined by the setting of the adjustable condenser 13. Thus there is produced in a third winding of the transformer 12, inductively coupled to the two first windings an oscillating current of desired frequency. The current thus produced is preferably the carrier current of the system.

For the double purpose of producing a modulating current and simultaneously amplifying the carrier or modulated current, there is provided a second thermionic device 20 having a usual filament 14, grid 16 and plate 15, and having a coupling between its plate or output circuit and its grid or input circuit to feed back energy. As shown, an inductive coupling is provided comprising a transformer or tickler coil 21, the primary and secondary windings of which are tuned by a pair of variable condensers 22 and 23 respectively. The input circuit of the thermionic device 20 includes the third winding of the transformer 12 in which the modulating current is induced, as previously described. The output circuit 24 of the device 20 includes a usual plate battery 25 and one winding of a transformer 26. The other winding of the transformer 26 is connected between an antenna 27 and ground 28, whereby Hertzian waves may be impressed upon the ether. The transformer 26 may be of the so-called loose coupled type, so that the inductive coupling of the output circuit and the antenna circuit may be variably adjusted. The antenna circuit 27, 28 is preferably tuned to the same frequency as that of the oscillations produced by the generator 10. The ground 28 may be replaced by a so-called counterpoise, consisting of a group of wires laid on or near the ground, or any other desired means may be employed for impressing the waves upon the ether. It is also understood that the system may be employed for continuous wave wire communication. In such a case, the antenna 27 and ground 28 are replaced by a pair of wires extending to the distant station.

In the operation of the system shown in Fig. 1, the circuits of the several batteries having been closed, a regenerative action takes place in the circuits of the thermionic device 20 due to the well known amplifying characteristics of such tubes. The feeding back of energy from the plate circuit winding of the tickler coil 21 into the grid circuit winding causes a subsequent impulse in the plate circuit which again is fed back thus producing sustained oscillations of frequency lower than those of generator 10.

The frequency of these oscillations is determined by the adjustments of the condensers 22 and 23.

The device 11 and its associated circuits also act as a generator of sustained oscillations as described above, the transformer 12 having windings which are connected to feed back energy from the plate circuit to the grid circuit. The frequency of these oscillations may be varied at will by adjusting the variable condenser 13, or otherwise varying the resonance of its circuit. The frequency of the oscillations is, however, preferably always that to which the antenna circuit 27, 28 is tuned.

The device 20 acts as an amplifier of the oscillations produced by device 10, at the same time oscillating itself at the modulating frequency. When so oscillating its amplifying ability varies during each cycle thereby modulating the oscillations of device 10.

The modified embodiment of the invention shown in Fig. 2, also includes a generator 10 of oscillatory currents. As in Fig. 1 the generator 10 may comprise a thermionic device 11, a transformer 12 and a variable condenser 13, connected for producing sustained oscillations of relatively high frequency. The device 11 is provided with a filament 14, plate 15, and grid 16, and the generator 10 also comprises a filament battery 17 and a plate potential battery 18 as in Fig. 1. The transformer 12 is arranged to feed back energy from the output or plate circuit to the input or grid circuit, and thus a regenerative action is secured whereby there is produced sustained oscillations of a desired high frequency. It is understood, however, that any other suitable means for producing continuous oscillating current may be employed.

For the double purpose of producing a modulating current and simultaneously amplifying the carrier or modulated current, there is provided a pair of thermionic devices 30 and 31, each having a usual filament 14, grid 16, and plate 15 and each having a coupling between its plate or output circuit and its grid or input circuit to feed back energy. As shown, an inductive coupling is provided for the thermionic device 30, comprising a primary winding 32 and a secondary winding 33, and a similar coupling comprising a primary winding 34 and a secondary winding 35 is provided for the thermionic device 31. These windings are shunted about suitable condensers 36, 37 and 38, 39, respectively, whereby the associated circuits may be made resonant to desired frequencies and whereby the frequency of the sustained modulating oscillations may be determined. The input or grid circuit of the thermionic device 30 including the winding 33 and the condenser 37 is connected in series with the third winding of the transformer 12 whereby the current delivered from the source 10 is impressed upon the thermionic device 30. Similarly, the input or grid circuit of the thermionic device 31 including the winding 35 and the condenser 39 is connected to the same winding of the transformer 12, and the output current of the source 10 is impressed upon the thermionic device 31. The plate or output circuit 40 of the thermionic device 30 includes a winding 41 of a transformer 42 and also contains the winding 32 connected across the condenser 36 and the plate circuit of the thermionic device 31 includes a second winding 43 of the transformer 42 and the winding 34 connected across the condenser 38. A plate battery 44 is common to both of said output circuits. The plate battery 44 maintains a relatively high potential upon the plates 15 of both thermionic devices 30 and 31. The third winding 45 of the transformer 42 is connected between an antenna 46 and ground 47, whereby Hertzian waves are impressed upon the ether. The transformer 42 may be of the so-called loose coupled type so that the inductive coupling of the output circuits and the antenna circuit may be variably adjusted. It is understood that the ground 47 may be replaced by a so-called counterpoise and that the system may be employed, if desired, for wire systems of communication. In the latter case the antenna 46 and ground 47 are replaced by a pair of wires extending to the distant station.

For reversing the inductive effect of the winding 43 upon the third winding 45 there is provided a reversing key 50 of conventional design, arranged to be positioned as desired, and connected in well known manner for reversing the direction of current through the winding 43.

In the operation of the system shown in Fig. 2, the circuits of the several batteries having been closed a regenerative action occurs in the circuits of the thermionic devices 30 and 31 due to a feeding back of energy through the windings 32, 33 and 34, 35. This produces in each of the output circuits sustained oscillations whose frequencies are determined by the condensers 36, 37 and 38, 39, respectively. The arrangement is preferably such that sustained oscillations of substantially the same frequency are produced in the output circuits of the two thermionic devices 30 and 31.

The source 10 produces an oscillating current having a frequency higher than that produced by the regenerative action of the devices 30, 31, and potentials of the higher frequency are impressed upon the grid circuits of the devices 30, 31. The oscillations generated by the source 10 are simultaneously modulated and amplified by the thermionic devices 30 and 31, and there are thus produced in the windings 41 and 43 corresponding series of modulated high frequency currents. The key 50 may be used for changing the effect of the electromagnetic field produced by the current in the winding 43 upon the output circuit comprising winding 45 for the purpose of sending signals. Thus it will be seen that I have provided a system for the production of modulated high frequency currents of high power by simultaneously modulating and amplifying the current by means of tubes which are themselves oscillating.

The construction illustrated and described herein is merely what I now consider to be the preferred embodiment of my invention, and it is therefore to be distinctly understood that I do not limit myself thereto as many changes may be made in point of detail and other embodiments resorted to without deviating from the true spirit and scope of my invention as defined by the appended claims.

What I claim is:—

1. The method of producing power for systems for the transmission of intelligence, which consists in producing a series of undamped waves of a given frequency and simultaneously modulating said waves by a second series of waves, generating said second series of waves of a relatively different frequency, and amplifying said first-named series of waves.

2. The method of producing power for systems for the transmission of energy, which consists in generating an alternating current of a given frequency and simultaneously modulating said current by a second simultaneously generated current of regular and different frequency and amplifying said first named current.

3. The method of producing power for systems for the transmission of intelligence which consists in producing sustained oscillations of a given high frequency, modulating said oscillations by a second series of self generated sustained oscillations of regular and lower frequency and amplifying said high frequency oscillations, and generating said last mentioned oscillations simultaneously with said modulation.

4. The method of producing power for systems for the transmission of intelligence which consists in producing a series of undamped waves of a given high frequency, modulating said waves by a second series of continuous waves of regular and lower frequency and generating said last named waves simultaneously with said modulation.

5. The method of producing power for systems for the transmission of intelligence which consists in generating an alternating current of a given high frequency and simultaneously producing alternating current of regular and lower frequency, modulating said first-named current by said second current and amplifying said first-named current.

6. The method of producing power for systems for the transmission of intelligence which consists in producing sustained oscillations of a given frequency, and simultaneously varying the amplitude of said oscillations in accordance with a second series of regular sustained oscillations of different frequency and producing said last mentioned oscillations.

7. The method of producing power for systems for the transmission of intelligence which consists in generating an alternating current of a given frequency and simultaneously varying the amplitude of said current in accordance with a second simultaneously produced alternating current of regular and different frequency and amplifying said current.

8. The method of producing power for systems for the transmission of intelligence which consists in producing sustained oscillations of a given high frequency, and simultaneously producing a second series of sustained oscillations of regular and lower frequency, varying the amplitude of said first-mentioned series of oscillations in accordance with said second series of self generated oscillations and amplifying said first mentioned series of oscillations.

9. A transmission system for radiant energy comprising means for producing sustained oscillations of a predetermined frequency, and a single means for producing a second series of sustained oscillations to modulate the first named series and for amplifying said first named oscillations.

10. A transmission system for radiant energy comprising means for producing sustained oscillations of a predetermined frequency, and a single means for producing sustained oscillations of a relatively different frequency to modulate the first named oscillations and for amplifying said oscillations.

11. A transmission system for radiant energy comprising means for producing sustained oscillations of a predetermined high frequency, and a single means for simultaneously producing sustained oscillations of a relatively lower frequency to modulate the high frequency oscillations and for amplifying said oscillations.

12. Apparatus for producing power for systems for the transmission of intelligence by radiant energy comprising means for producing an alternating current of a given frequency and means for modulating said current adapted to generate a second alternating current of relatively different frequency and for amplifying said current.

13. A transmission system for radiant energy comprising means for producing sustained oscillations of a predetermined, high frequency and a thermionic oscillator receiving the output of said producing means for producing current of lower frequency and modulating said oscillations in accordance with said current of lower frequency.

14. A transmission system comprising means for producing sustained oscillations of a predetermined, high frequency and a self-excited, thermionic oscillator coupled with and receiving the output of said producing means for producing oscillations of lower frequency and modulating said first-mentioned oscillations in accordance with said oscillations of lower frequency.

15. A transmission system for radiant energy comprising means for producing sustained oscillations of a predetermined, high frequency and a vacuum tube oscillator comprising means for producing current of lower frequency, modulating said oscillations in accordance with said current of lower frequency, and simultaneously amplifying said oscillations.

16. A transmission system comprising means for producing alternating current of high frequency, and a plurality of self oscillating vacuum tube modulators having input circuits comprising a common portion inductively coupled with said producing means and separate portions arranged in parallel with each other and connected to said common portion between the modulator tubes and the point of coupling of said common portion to said producing means.

17. A transmission system for radiant energy comprising means for producing alternating current of high frequency, and a plurality of vacuum tube oscillators for producing current of lower frequency to modulate said first mentioned current, said oscillators having input circuits comprising a common portion coupled with said producing means and separate portions arranged in parallel with each other and connected to said common portion between the oscillator tubes and the point of coupling of said common portion with said producing means.

18. A transmission system for radiant energy comprising a source of high frequency oscillations, a plurality of vacuum tube modulators having input circuits comprising a common portion coupled with said source and separate portions connected to said common portion between the modulator tubes and the point of coupling of said common portion with said source, an antenna, means for coupling the output circuits of said modulators with the antenna, and means in the output circuit of one of said modulators for alternatively causing the energy in said circuit to add to or oppose the energy in the output circuit of the other modulator with respect to the antenna, said means being operable to modify the energy radiated from the antenna in a manner such as to form signals.

19. A transmission system for radiant energy comprising means for producing high frequency oscillations, a plurality of vacuum tube oscillators for producing sustained oscillations of lower frequency than said first-mentioned oscillations to modulate them, means for coupling the input circuits of said oscillators to said producing means, said input circuits comprising portions connected in series with the coupling to the producing means and in parallel with each other, means for causing said oscillators to produce sustained oscillations of substantially equal frequency, an antenna, means for coupling the output circuits of said oscillators to the antenna, and means for alternatively causing the current in the output circuit of one of said oscillators to add to or oppose the current in the output circuit of another of said oscillators with respect to the antenna, so as to enable the energy radiated from the antenna to be modified in accordance with signals.

20. Apparatus for producing power for systems for the transmission of intelligence of radiant energy comprising means for producing an alternating current of a given frequency and a single thermionic means for modulating said current, adapted to generate a second alternating current of relatively different frequency, and for amplifying said current.

In testimony whereof I hereunto affix my signature.

EMORY LEON CHAFFEE.